(12) United States Patent
Chebiyyam et al.

(10) Patent No.: US 12,405,358 B1
(45) Date of Patent: Sep. 2, 2025

(54) MULTIPATH INTERFERENCE DETECTION

(71) Applicant: Zoox, Inc., Foster City, CA (US)

(72) Inventors: Venkata Subrahmanyam Chandra Sekhar Chebiyyam, San Francisco, CA (US); Yongzhe Chen, San Jose, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 1150 days.

(21) Appl. No.: 17/225,799

(22) Filed: Apr. 8, 2021

(51) Int. Cl.
*G01S 7/487* (2006.01)
*G01S 17/931* (2020.01)
*G06T 7/44* (2017.01)

(52) U.S. Cl.
CPC ............ *G01S 7/487* (2013.01); *G01S 17/931* (2020.01); *G06T 7/44* (2017.01)

(58) Field of Classification Search
None
See application file for complete search history.

(56) References Cited

U.S. PATENT DOCUMENTS

| 11,561,292 B1* | 1/2023 | Subasingha | G01S 7/4808 |
| 2020/0158876 A1* | 5/2020 | Karadeniz | G01S 7/4808 |
| 2021/0096263 A1* | 4/2021 | Subasingha | G01S 17/931 |

* cited by examiner

*Primary Examiner* — Haris Sabah
(74) *Attorney, Agent, or Firm* — Lee & Hayes, P.C.

(57) ABSTRACT

Techniques for determining multipath interference associated with a surface in an environment based on sensor data are discussed herein. The sensor data may be captured and received from a sensor associated with a vehicle travelling through an environment. The sensor data may include depth data (which may be received as phase data) and intensity data associated with the environment. The depth data and the intensity data may be associated with various surfaces in the environment. Based on the relative changes between corresponding depth data and intensity data for a particular surface, multipath interference associated with either of the depth data or the intensity data may be determined.

20 Claims, 5 Drawing Sheets

MULTIPATH INTERFERENCE DETECTION

BACKGROUND

A vehicle may use time-of-flight sensors to capture sensor data to detect surfaces in an environment. Accurate determinations of surfaces in predetermined distance ranges can assist, for example, a vehicle to traverse the environment. However, environments that include multiple surfaces at different distances may be difficult to interpret, for example, due to ambiguity in the sensor returns. Such shortcomings may result in unreliable data, increased processing time to better understand the data, and/or decreased efficiency in identifying and/or characterizing surfaces that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
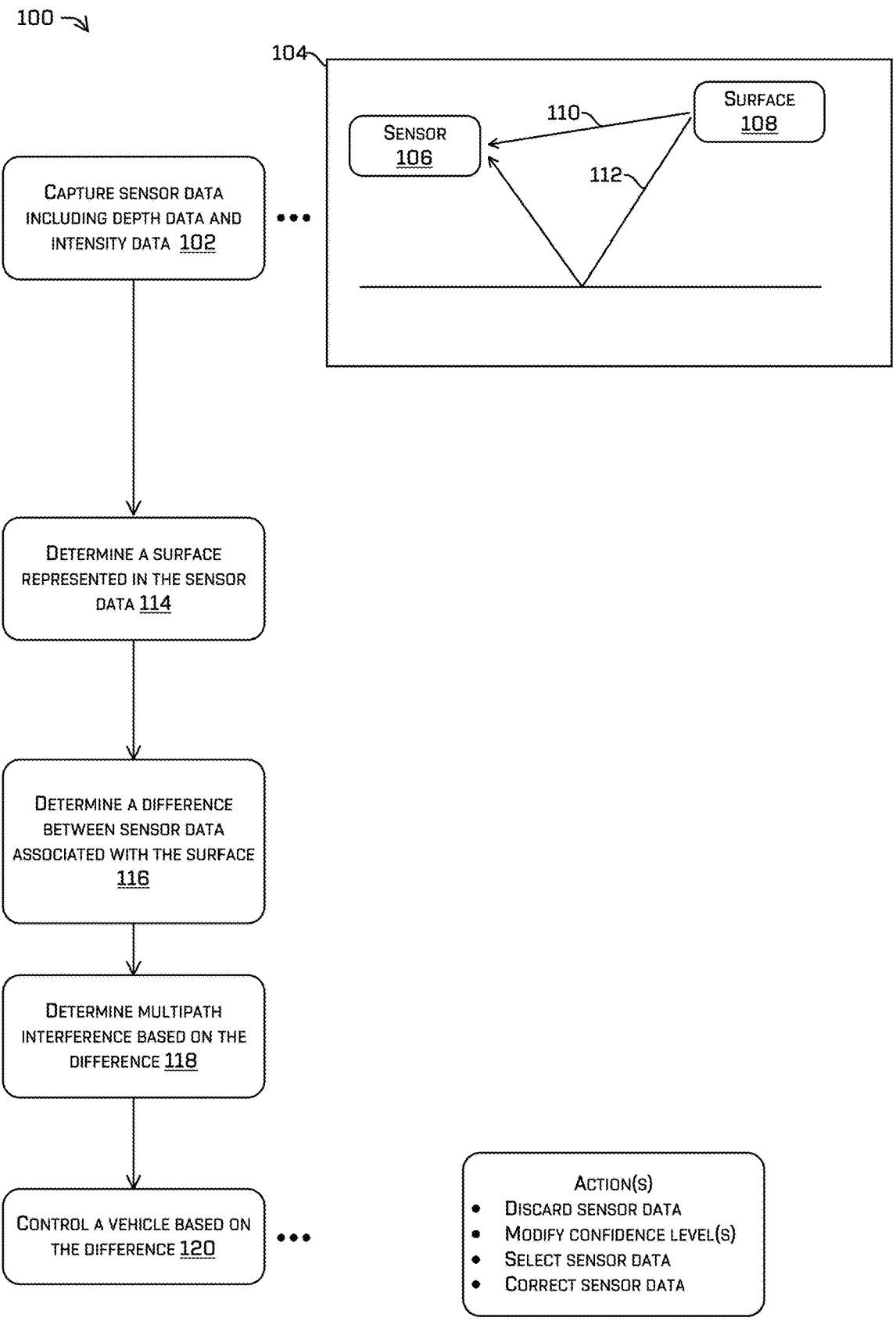
FIG. 1 is a pictorial flow diagram of an example process for determining multipath interference, in accordance with examples of the disclosure.

Techniques for determining an anomalous state associated with sensor data generated by a sensor of a vehicle are discussed herein. Such sensors may include, but are not limited to, an image sensor, a lidar sensor, a time-of-flight (ToF) sensor, a radar sensor, a sonar sensor, combinations thereof, and the like. Such anomalous sensor data may, for example, be based at least in part on (in the case of lidar, time of flight, cameras, and other optical systems) whether the surface from which the light reflects is lambertian or not, whether there is interference from multipath sources, or the like. The techniques may include receiving sensor data from sensors associated with a vehicle travelling through an environment. The sensor data may include depth data (e.g., phase data) and intensity data associated with the environment. The depth data and the intensity data may be associated with various surfaces in the environment. In some examples, based on relative changes between corresponding depth data and intensity data for a particular surface, object, or region, the techniques can include determining if anomalous data (e.g., in either depth or intensity) may be due to such multipath interference or other surface characteristics (e.g., lambertian or otherwise).

As discussed herein, sensor data can be captured by one or more sensors, which can include time-of-flight sensors, radar sensors, lidar sensors, sonar sensors, image sensors, microphones, or any combination thereof. In some cases, the sensor can include an emitter to emit a signal and a sensor to sense a return signal from the environment. Further, the sensor can comprise a sensor computing device to determine a data format of the captured sensor data.

In the context of a ToF sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of 2-11 to (211-1)). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity value and a depth value for each pixel) in the sensor data. The sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, sensor data (e.g., captured sensor data) that is captured from the sensors may be utilized to determine information associated with surfaces in the environment. The captured sensor data may be utilized to determine surface sensor data associated with a surface (e.g., a surface of an object (e.g., a pedestrian or a reflective object (e.g., a lambertian object)), a structure, a floor, etc.) of the environment. The surface sensor data may include data of a type of data. The data type may include depth or intensity. The data of the type of data may include surface depth data (e.g., surface phase data) or surface intensity data. The surface depth data and the surface intensity data may be associated with the surface. The surface sensor data may include data of different types (e.g., data types associated with the intensity format and the depth format) of data. The surface sensor data may include the surface depth data and the surface intensity data. Portions of the surface sensor data may be utilized to determine data values associated with the surface sensor data. A portion of the surface sensor data may include the surface depth data or the surface intensity data.

In certain active sensor systems (e.g., lidar, ToF, structured light sensors, etc.), the captured sensor data may be based on light emitted by an emitter. For example, a light beam may be transmitted by the ToF sensor, reflected by the surface, and received by the ToF sensor. The light beam may be reflected based on a characteristic (e.g., reflectivity) of the surface. The light beam may be transmitted, as a transmitted light beam, by the ToF sensor. The light beam may be reflected, as a reflected light beam, by the surface. The light beam may be received, as a received light beam, by the ToF sensor. In some examples, a reflected light beam may be received as a direct reflection or as an indirect reflection, as discussed below. In some examples, the ToF sensor may receive both direct reflections and indirect reflections, which may be indicative of multipath interference. The data received at the sensor, then, will not correctly indicate the depth or intensity of the surface from which both paths of light were reflected, which may present errors and/or cause safety issues (for example, in the case of relying on such data for use in navigating autonomous vehicles).

Multiple light beams may be received by the sensor as reflected light beams. A first light beam may be received from the surface and by the ToF sensor, as the direct reflection. A second light beam may be received from the surface and by the ToF sensor, as an indirect reflection. The second light beam may be received at a different time and/or by a different path than the first light beam. The indirect reflection may include a reflection by a surface and may occur after the first light beam or the second light beam is reflected by the surface. The object associated with the indirect reflection may be an object (e.g., a ground surface, a building, a pedestrian, a vehicle, a lambertian object, etc.) in the environment through which the vehicle is travelling. Receiving direct reflections and indirect reflections may be manifested in the sensor data as multipath interference.

The multipath interference may be associated with, and/or caused by, characteristics (e.g., magnitudes) of the light beams received by the ToF sensor. The magnitudes of the light beams may include a first magnitude associated with the first light beam and a second magnitude associated with the second light beam. The magnitudes may include the first magnitude being combined with the second magnitude, as a combined magnitude. The magnitudes may be associated with phases and intensities of the light beams. The first magnitude of the first light beam may be associated with a phase (e.g., a first phase) and an intensity (e.g., a first intensity) of the first light beam. The second magnitude of the second light beam may be associated with a phase (e.g., a second phase) and an intensity (e.g., a second intensity) of the second light beam. The combined magnitude of the combined light beam may be associated with a phase (e.g., a combined phase) and an intensity (e.g., a combined intensity) of the combined light beam. In some instances, the combined phase may be associated with the first light beam being in phase with the second light beam. In some instances, the combined phase may be associated with the first light beam having a phase that is orthogonal to a phase of the second light beam. The combined magnitude associated with the light beams being in phase with each other may be higher than the combined magnitude associated with the light beams having phases that are orthogonal to each other.

The combined light beams may have different magnitudes associated with the multipath interference being determined based on different types of data. The light beams in phase with each other may have a magnitude associated with a difference (e.g., a first difference), and with the depth values greatly differing from each other. The light beams associated with the first difference may be associated with the surface depth data that includes phase elements (e.g., a first phase element and a second phase element) in a region. The light beams in phase with each other may have a magnitude that is associated with a difference (e.g., a second difference) with the intensity values greatly differing from each other. The light beams associated with the second difference may be associated with the surface intensity data that includes the pixels (e.g., the first pixel and the second pixel) in an associated region. The magnitude associated with the second difference may be greater than the magnitude associated with the first difference. Any region of the sensor data utilized to determine any sensor data value (e.g., the depth values and/or the intensity values) may be determined by determining semantic segmentation information associated with the sensor data, fitting a surface to a portion of the first data, applying a region growing operation to the sensor data, determining a region of a fixed size, and/or applying an edge detection operation to the sensor data.

Different types of comparisons may be performed based on different types of data values. In some examples, the multipath interference may be manifested as noise in depth data while intensity data associated with a surface may be smooth. Intensity values associated with a region of a surface may be determined based on the sensor data. The region may be determined by determining semantic segmentation information associated with the sensor data (e.g., the intensity data), fitting a surface to a portion of the first data, applying a region growing operation to the intensity data, determining a region of a fixed size, and/or applying an edge detection operation to the intensity data. A region or surface in the intensity data may be determined based on intensity values not greatly differing from each other. The intensity values not greatly differing from each other may be determined based on a difference between a first intensity value and a second intensity value. Depth values for an associated region of the surface may be determined based on the sensor data. The multipath interference may be determined based on depth values greatly differing from each other. The depth values greatly differing from each other may be determined based on a difference between a first depth value and a second depth value.

In some examples, the multipath interference may be manifested as noise in intensity data while depth data associated with a surface may be smooth. For example, a ToF sensor may receive a direct beam associated with a first phase value and a first intensity value and may receive a multipath beam associated with the same first phase value and a second intensity value. Thus, the measured value for the particular pixel or element may be a combination of the direct beam and the multipath beam. The first phase value may be associated with a region of a surface, the region being determined based on the sensor data. The region may be determined by determining semantic segmentation information associated with the sensor data (e.g., the phase data), fitting a surface to a portion of the first data, applying a region growing operation to the phase data, determining a region of a fixed size, and/or applying an edge detection operation to the phase data. Because, in this example, the direct beam and the multipath beam have the same phase shift, the multipath interference may not be detectable in the phase domain. However, because the measured intensity may be a combination of the intensity values of the direct beam and the multipath beam, the measured intensity value may be anomalous and/or degraded because of the multipath interference (e.g., measured intensity may equal or be proportional to the sum of the first intensity value or the second intensity value).

The multipath interference may be determined and utilized to remove or correct portions of the image. The image may be modified to discard any pixel associated with the multipath interference or pixels associated with the multipath interference may be ignored in further processing. The first pixel or the second pixel may be discarded (e.g., removed from the image), as the candidate pixel. The candidate pixel may be discarded based on determining the candidate pixel likely is associated with the multipath interference. Alternatively, the candidate pixel may be corrected and utilized in the image. The candidate pixel may be corrected based on one or more other pixels within the proximity. For example, the candidate pixel may be corrected based on the other pixel(s) separated from the candidate pixel by a distance that is less than a threshold distance. The candidate pixel may be modified and determined, as a modified candidate pixel, to be the same as the candidate pixel.

The multipath interference may be determined and utilized to smooth out the image. The image may be smoothed by applying a smoothing filter to the surface sensor data. The smoothing filter may be applied to the surface depth data and/or the surface intensity data. The candidate pixel may be corrected based on other pixels. The other pixels may be separated from the candidate pixel by a distance (e.g., in the image space) that is less than a threshold distance. The candidate pixel may be determined, as a modified candidate pixel, based on the other pixels being utilized to correct the candidate pixel. An interpolation may be performed between the other pixels. A result of the interpolation may include the modified candidate pixel based on a portion of the data associated with each of the other pixels. The modified candidate pixel may include a combined pixel, with each of the other pixels being combined into the combined pixel. The candidate pixel may be converted into the combined pixel, as the modified candidate pixel. In some examples, each of the other pixels may be positioned on any side of the candidate pixel. In those examples, the other pixels may be on opposite sides of the candidate pixel.

Reference values (e.g., threshold values) may be utilized to analyze the surface sensor data. Various threshold values (e.g., cluster threshold values, interference threshold values) may be utilized to cluster or otherwise group sensor data and/or to determine whether the surface sensor data is associated with (e.g., impacted by) multipath interference. For example, the cluster threshold values may be associated with sensor data in a first domain (e.g., an intensity domain or a phase domain). Further, the interference threshold values may be associated with sensor data in a second domain (e.g., an intensity domain or a phase domain). The first domain to which the cluster threshold values are applied may be different from the second domain to which the interference threshold values are applied.

The cluster threshold values may be utilized to cluster or group the sensor data. The clustered or grouped sensor data may be determined as a group of pixels or elements. The group of pixels may be enclosed in a perimeter, within an outlier region. The group of pixels determined based on the cluster threshold value may be utilized to determine sensor data values (e.g., the intensity values and the phase values) associated with pixels. The cluster threshold value may be determined based on a lens property (e.g., a point spread function).

In addition to or in the alternative to being determined based on any of the cluster threshold values, pixels associated with the intensity values may be determined based on a neighborhood of pixels, a surface in the environment that is fit to the neighborhood of pixels, and/or segmentation information. Pixels associated with the intensity values may be determined in a first region associated with the surface. For example, pixels associated with the intensity values may include a pixel associated with the first intensity value being determined, and then include a pixel associated with the second intensity value being determined based on the pixel associated with the first intensity value. The pixel associated with second intensity value may be further determined based on the neighborhood of pixels, the surface in the environment that is fit to the neighborhood of pixels, or the segmentation information.

In addition to or in the alternative to being determined based on any of the cluster threshold values, elements associated with the depth values for the first variation determination may be determined based on a neighborhood of pixels, a surface in the environment that is fit to the neighborhood of pixels, or segmentation information. Elements associated with the depth values may be determined for a second region associated with the surface (e.g., a second region associated with the first region). For example, the elements associated with the depth values may include the element associated with the first depth value being determined, and then the element associated with the second depth value being determined based on the element associated with the first depth value. The element associated with the second depth value may be further determined based on the neighborhood of pixels, the surface in the environment that is fit to the neighborhood of pixels, or the segmentation information. Examples of segmentation are discussed in, for example, U.S. patent application Ser. No. 15/820,245 titled "Sensor Data Segmentation" and filed Nov. 21, 2017, which is incorporated by reference herein in its entirety for all purposes.

The interference threshold values may be utilized to determine whether the surface sensor data is associated with (e.g., impacted by) the multipath interference. In some examples, the interference threshold values may be expected variations. An interference threshold value (e.g., a threshold value or a threshold difference) may be determined based on the surface depth data, the surface intensity data, or one or more characteristics of the ToF sensor. The characteristic(s) may include, but is not limited to, a quantum efficiency of the sensor, a noise floor of the sensor, or shot noise of the sensor. The interference threshold value may include an interference threshold value (e.g., a threshold depth value (e.g., a threshold phase value)) associated with the surface depth data, an interference threshold value associated with the surface intensity data (e.g., a threshold intensity value), or an interference threshold value (e.g., a threshold combined value) associated with both the surface depth data and the surface intensity data.

The interference threshold values may be converted (e.g., normalized) for performing comparisons between the interference threshold values. The threshold depth value may be a converted threshold depth value, which may be determined based on an unconverted (e.g., unnormalized) threshold depth value. The threshold intensity value may be a converted (e.g., normalized) threshold intensity value, which may be determined based on an unconverted (e.g., unnormalized) threshold intensity value. The threshold combined value may be a converted (e.g., normalized) threshold combined value, which may be determined based on a converted threshold depth value and a converted threshold intensity value. The threshold depth value determined based on a conversion of the unconverted threshold depth value may be associated with (e.g., integrated with and/or combined with) the threshold intensity value determined based on a conversion of the unconverted threshold intensity value. The threshold combined value may be determined based on a combination of the threshold depth value and the threshold intensity value. In some examples, any of the threshold depth value, the threshold intensity value, and the threshold combined value may be the same as one or more of the other threshold values. In other examples, any of the threshold depth value, the threshold intensity value, and the threshold combined value may be different from one or more of the other threshold values.

The surface sensor data may be determined to be associated with multipath interference based on comparisons between data values associated with the surface sensor data and the interference threshold values. The comparisons may be utilized to determine whether portions of the surface sensor data are associated with multipath interference. The portions of the surface sensor data may include the surface depth data and/or the surface intensity data. The comparisons may be performed utilizing data values of the surface sensor data. A comparison may be performed with a difference between data values associated with the surface sensor data, and a threshold value (e.g., a threshold difference). The comparison may be performed by determining the data values are separated by a value that meets or exceeds an interference threshold value.

In some examples, a surface in the environment that is fit to the neighborhood of pixels may be utilized, instead of or in addition to the interference threshold values, to analyze (e.g., perform the comparison with) the data values. The surface may include a constantly varying surface (e.g., a sloped surface, etc.). The comparison may include determining whether a difference between the data values meets or exceeds a difference between predicted data values for corresponding portions of the surface associated with the data values.

The comparisons may be performed based on interference threshold values associated with the surface depth data and/or the surface intensity data. The interference threshold values utilized in any of the comparisons may include the threshold depth value, the threshold intensity value, and/or the threshold combined value. A comparison may be performed by utilizing depth values associated with the surface depth data. Performing the comparison may include determining whether the depth values are separated by a value meeting or exceeding the interference threshold value. A comparison may be performed by utilizing intensity values associated with the surface intensity data. Performing the comparison may include determining whether the intensity values are separated by a value meeting or exceeding the interference threshold value.

The multipath interference may be determined based on a variation determination (e.g., a first variation determination) associated with depth values greatly differing from each other. The first variation determination may be further associated with intensity values not greatly differing from each other. The surface intensity data and the surface depth data utilized for the first variation determination may be associated with regions. The regions may include a region (e.g., the first region) associated with the surface intensity data and a region (e.g., the second region) associated with the surface depth (or phase) data. In some examples, the second region may be associated with, and/or correspond to, the first region. The first region may be associated with pixels (e.g., a first pixel and a second pixel). The first pixel may have the first intensity value and the second pixel may have the second intensity value. The second region may be associated with phase elements (e.g., the first phase element and the second phase element). The first phase element may have the first depth value and the second phase element may have the second depth value. The first variation determination may be utilized to determine the first phase element and/or the second phase element as a candidate phase element associated with multipath interference.

The intensity values not greatly differing from each other may be determined based on a difference between a first intensity value and a second intensity value being less than a threshold difference. The first intensity value may be within the interference threshold value from the second intensity value. The interference threshold value for the comparison between the intensity values may be associated with a portion of the sensor data (e.g., the surface depth data, the surface intensity data, both the surface depth data and the surface intensity data, etc.). The comparison utilizing the threshold difference between the intensity values may be performed alternatively, or additionally, to the comparison utilizing the interference threshold value (e.g., the threshold depth value, the threshold intensity value, the threshold combined value, etc.). The comparisons utilizing different types of interference threshold values (e.g., the threshold difference or the interference threshold value) may yield the same result in different ways.

In addition to or in the alternative to being analyzed based on any of the interference threshold values, the intensity values for the first variation determination may be analyzed based on the constantly varying surface. In some examples, the intensity values for the first variation determination may be analyzed based on predicted intensity values. The predicted intensity values may be determined based on the constantly varying surface (e.g., neighboring portions of the constantly varying surface).

The depth values greatly differing from each other may be determined based on a difference between the first depth value and the second depth value meeting or exceeding a threshold difference. The first depth value may be within the interference threshold value away of the second depth value. The interference threshold value for the comparison between the depth values may be associated with a portion of the sensor data (e.g., the surface depth data, the surface intensity data, both the surface depth data and the surface intensity data, etc.). The comparison utilizing the threshold difference may be performed alternatively, or additionally, to the comparison utilizing the interference threshold value (e.g., the threshold depth value, the threshold intensity value, the threshold combined value, etc.). The comparisons utilizing different types of interference threshold values (e.g., the threshold difference or the interference threshold value) may yield the same result in different ways.

In addition to or in the alternative to being analyzed based on any of the interference threshold values, the depth values for the first variation determination may be analyzed based on the constantly varying surface. In some examples, the depth values for the first variation determination may be analyzed based on predicted depth values. The predicted depth values may be determined based on the constantly varying surface (e.g., neighboring portions of the constantly varying surface).

In some examples, the multipath interference may be determined based on a variation determination (e.g., a second variation determination) associated with intensity values greatly differing from each other. The intensity values greatly differing from each other may be determined based on a difference between a third intensity value and a fourth intensity value meeting or exceeding a threshold difference. The third intensity value may be at or above the interference threshold value away from (e.g., less than or greater than) the fourth intensity value. The interference threshold value for the comparison between the intensity values may be associated with a portion of the sensor data (e.g., the surface depth data, the surface intensity data, both the surface depth data and the surface intensity data, etc.). The comparison utilizing the threshold difference may be determined alternatively, or additionally, to the comparison utilizing the interference threshold value (e.g., the threshold depth value, the threshold intensity value, the threshold combined value, etc.). The comparisons utilizing different types of interference threshold values (e.g., the threshold difference or the interference threshold value) may yield the same result in different ways.

In addition to or in the alternative to being analyzed based on any of the interference threshold values, the intensity values for the second variation determination may be analyzed similarly to the intensity values for the first variation determination. For example, the intensity values for the second variation determination may be analyzed utilizing predicted intensity values based on the constantly varying surface (e.g., neighboring portions of the constantly varying surface).

The second variation determination may be further associated with depth values not greatly differing from each other. The depth values not greatly differing from each other may be determined based on a difference between a third depth value and a fourth depth value being less than a threshold difference. The third depth value may be within the interference threshold value from the fourth depth value. The interference threshold value for the comparison between the depth values may be associated with a portion of the sensor data (e.g., the surface depth data, the surface intensity data, both the surface depth data and the surface intensity data, etc.). The comparison utilizing the threshold difference may be determined alternatively, or additionally, to the comparison utilizing the interference threshold value (e.g., the threshold depth value, the threshold intensity value, the threshold combined value, etc.). The comparisons utilizing different types of interference threshold values (e.g., the threshold difference or the interference threshold value) may yield the same result in different ways.

In addition to or in the alternative to being analyzed based on any of the interference threshold values, the depth values for the second variation determination may be analyzed similarly to the depth values for the first variation determination. For example, the depth values for the second variation determination may be analyzed utilizing predicted depth values based on the constantly varying surface (e.g., neighboring portions of the constantly varying surface).

The surface intensity data and the surface depth data utilized for the second variation determination may be associated with regions. The regions may include a region (e.g., a third region) associated with the surface intensity data and a region (e.g., a fourth region) associated with the surface depth data. In some examples, the fourth region may be associated with, and/or correspond to, the third region. The third region may be associated with pixels (e.g., a third pixel and a fourth pixel). The third pixel may have the third intensity value and the fourth pixel may have the second intensity value. The fourth region may be associated with phase elements (e.g., a third phase element and a fourth phase element). The third phase element may have the third depth value and the fourth phase element may have the fourth depth value. The second variation determination may be utilized to determine the first pixel and/or the second pixel as a candidate pixel associated with multipath interference.

The portions of the sensor data (e.g., the portions of the surface sensor data) may be utilized to determine multipath interference indications at different levels (e.g., strengths). The different levels of indications of multipath interference may be associated with different types of surface sensor data (e.g., the depth value or the intensity value). A level of the first indication associated with the depth value greatly differing from the interference threshold value may be higher than a level of the second indication associated with the intensity value greatly differing from the interference threshold value. The depth value may be utilized to determine the multipath interference more accurately and/or predictably than the intensity value. The first indication associated with the depth value may be more accurate and/or predictable than the second indication associated with the intensity value. The first indication may be determined as a primary indication and the second indication may be determined as a secondary indication. The primary indication may be utilized in a default mode for determining the multipath interference. The secondary indication may be utilized in a backup mode for determining the multipath interference.

The different indications may be weighted differently. The indication based on the difference (e.g., the first difference) with the depth values greatly differing from each other may be given a higher weight than the indication based on the difference (e.g., the second difference) with the intensity values greatly differing from each other. The indication associated with the first difference may be given the higher weight based on the first difference being a stronger indication of the multipath interference than the indication associated with second difference. The first difference utilizing the depth values may be the stronger indication of the multipath interference than the second difference utilizing the intensity values.

The multipath interference determining techniques described herein can improve a functioning of a computing device by providing a robust method of estimating or otherwise determining multipath interference exhibited in light beams associated with a sensor (and/or of an environment). For example, determining whether the multipath interference is associated with the light beams may allow subsequent processes such as classification, tracking, prediction, route planning, trajectory generation, and the like to be performed more accurately, may require less processing power, and/or may require less memory. In some instances, faster and/or more accurate segmentation can be used in generating a trajectory of a vehicle, which can improve safety for occupants of a vehicle. Further, the techniques discussed may improve the safe operation of the vehicle. For instance, incorrect and/or noisy depth or intensity measurements due to such multipath interference or otherwise may result in degraded performance in safety critical operations and the techniques described herein may remediate such errors or noise. These and other improvements to the functioning of the computer are discussed herein.

The techniques described herein can be implemented in a number of ways. Example implementations are provided below with reference to the following figures. Although discussed in the context of a vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

Although a type of sensor data is discussed in the context of depth, phase may be used instead. Depth may be determined from the phase. Any of the terms "depth data," "surface depth data," "surface depth value," "threshold depth value," etc., related to depth may be used interchangeably with corresponding terms related to phase throughout this disclosure.

Figure 2:
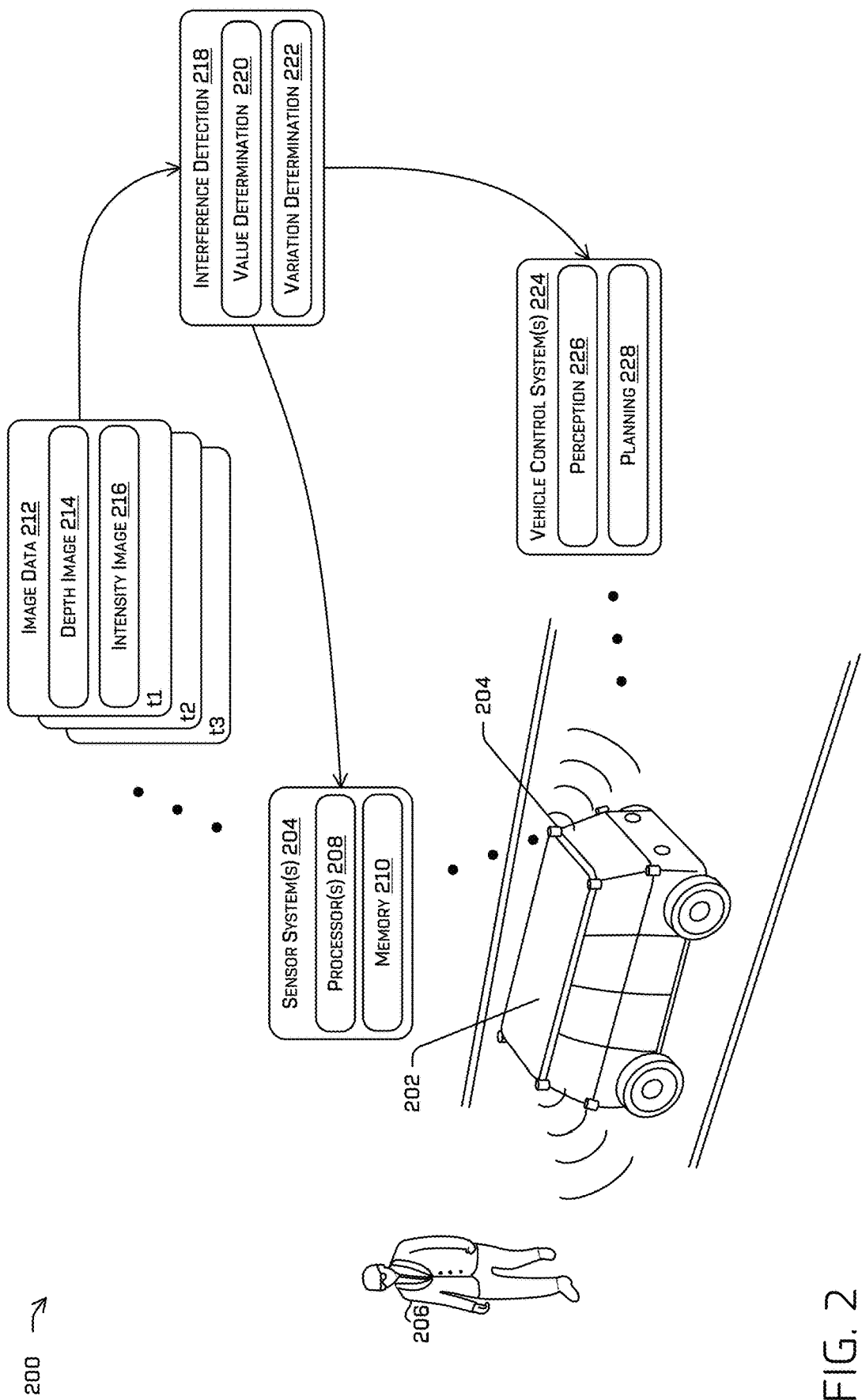
FIG. 2 illustrates an example environment and components of a vehicle, in accordance with examples of the disclosure.

FIG. 1 is a pictorial flow diagram of an example process for determining multipath interference, in accordance with examples of the disclosure. For example, the process 100 can be implemented using components and systems illustrated in FIG. 2 and described below, although the process 100 is not limited to being performed by such components and systems. Moreover, the components and systems of FIG. 2 are not limited to performing the process 100.

In more detail, the process 100 can include an operation 102 that includes capturing sensor data (e.g., captured sensor data) including depth data and intensity data. The sensor data may include image data. The image data may include pixels (e.g., intensity elements) and/or phase elements associated with the depth data and/or the intensity data. Any type of sensor data associated with a region may be utilized to determine an anomalous state for any other type of sensor data associated with another region. The sensor data may quadrature data captured from the sensor.

The pixels in the captured sensor data may include pixels in regions associated with the surface sensor data, which may include the surface depth data and/or the surface intensity data. The pixels in the regions may include a pixel (e.g., a first pixel) in a region (e.g., a first region) associated with the surface sensor data, which may include the surface intensity data. The pixels in the regions may include another pixel (e.g., a second pixel) in the first region associated with the surface intensity data. The second pixel may be adjacent and/or nearby to the first pixel. In addition or in the alternative, the second pixel may be within a proximity associated with the first pixel. For example, a distance (e.g., in image space) between the first pixel and the second pixel may be less than a threshold distance.

The pixels in the captured sensor data may be associated with phase elements associated with the surface sensor data. In some examples, the phase elements can also be represented as depth data, which may be determined from the phase data. In some instances, the phase element(s) and/or depth element(s) may be represented at image data and/or may be unprojected into a three-dimensional point cloud. That is, in some instances, the term "phase element" or "depth element" may refer to data represented as image data or point cloud data. The phase elements may include a phase element (e.g., a first phase element) in a region associated with the surface sensor data, which may include the surface depth data. The region associated with the surface depth data may correspond to the region associated with the surface intensity data. The pixels in the regions may be associated with (e.g., include) another phase element (e.g., a second phase element) in the region associated with the surface depth data. The second phase element may be adjacent to the first phase element. Alternatively or additionally, the second phase element may be within a proximity associated with the first phase element. For example, distance (e.g., in image space) between the first phase element and the second phase element may be less than a threshold distance.

An example 104 illustrates an environment including a sensor 106 and a surface 108. In some examples, the sensor 106 may be included in a vehicle, such as an autonomous vehicle. One or more light beams may be transmitted by the sensor 106, reflected by the surface 108, and received by the sensor 106. The light beam(s) may be reflected based on a characteristic (e.g., reflectivity) of the surface 108. The light beam(s) may be transmitted, as transmitted light beam(s), by the sensor 106. The light beam(s) may be reflected, as reflected light beam(s), by the surface 108. The light beam(s) may be received, as received light beam(s), by the sensor 106. The reflected light beam(s) being received, as the received light beam(s), by the sensor 106 may include a light beam (e.g., a first light beam) 110 or a light beam (e.g., a second light beam) 112. While described herein as using a single sensor (e.g., the sensor 106) which captures both intensity and depth information, it is contemplated that similar techniques can be used to identify anomalous data between sensors of different modalities. For example, the data may include data received from a camera and/or data received from a lidar sensor. The data received from the camera and/or the data received from a lidar sensor may be analyzed to determine whether any of the data is anomalous using the same techniques discussed herein.

In some examples, the light beam 110 may be received from the surface 108 as a direct reflection. In some examples, the light beam 112 (e.g., a multipath beam) may be received from the surface 108 as an indirect reflection (e.g., a reflection by a surface of an object (e.g., a ground surface, a pedestrian, a Lambertian object, etc.)). The light beam 110 and the light beam 112 may be received by the sensor 106 to generate the sensor data. The sensor data may be associated with a combined magnitude of the light beam 110 and the light beam 112. The captured sensor data may be associated with the light beam 110 and the light beam 112 being combined, as an aggregated sensor value.

The combined magnitude may be associated with a phase (e.g., a combined phase). In some instances, the combined phase may be associated with the light beam 110 being in phase with the light beam 112. In some instances, there may be a phase difference between the light beam 110 and the light beam 112. The measured phase value for the particular pixel receiving the light beams 110 and 112 may be represented as an additional or combination of the two phase values.

At operation 114, the process 100 may include determining a surface (e.g., the surface 108) represented in the sensor data (e.g., the captured sensor data). Although an object and a surface are discussed throughout this disclosure, it is not limited as such and any discussion associated with an object may alternatively be interpreted as being associated with a surface, and vice versa. The captured sensor data and the surface may be utilized to determine sensor data (e.g., surface sensor data) associated with the surface. The surface sensor data may include surface depth data and/or surface intensity data.

The surface sensor data may be transformed into the surface depth data and the surface intensity data. The surface depth data may be in a depth domain. The surface intensity data may be in an intensity domain.

The captured sensor data may be preprocessed in a domain to increase a contrast of the captured sensor data. In some example, preprocessing may include contrasting, thresholding, or sharpening edges of one or more objects in the captured sensor data. Alternatively or additionally, the preprocessing may include smoothing the captured sensor data in a domain and sharpening the captured sensor data in another domain. Any of the domains may include an intensity domain or a depth domain. The domain for smoothing may be different from the domain for sharpening.

In some examples, the operation 114 can include determining a region in one of the intensity data or the phase data whereby the values (e.g., intensity values for the intensity data, or phase values for the phase data) are within a cluster threshold value (e.g., based on a machine learning algorithm (e.g., a clustering algorithm (e.g., k-means, k-medians, expectation maximization (EM), hierarchical clustering), a region-growing algorithm, or the like).

Pixels associated with the intensity values for the first variation determination may be determined based on a neighborhood of pixels, a surface in the environment that is fit to the neighborhood of pixels, segmentation information, and the like. For example, the pixels associated with the intensity values may include the pixel associated with the first intensity value being determined, and then the pixel associated with the second intensity value being determined based on the pixel associated with the first intensity value. The pixel associated with the second intensity value may be determined based on the cluster threshold value. The pixel associated with the second intensity value may be determined based on determining a distance from the pixel associated with the first threshold intensity value that does not meet or exceed threshold distance. Alternatively or additionally, the pixel associated with the second intensity value may be further determined based on the neighborhood of pixels, the surface in the environment that is fit to the neighborhood of pixels, or the segmentation information.

Elements associated with the phase values for the first variation determination may be determined based on a neighborhood of pixels, a surface in the environment that is fit to the neighborhood of pixels, or segmentation information. For example, the elements associated with the phase values may include the element associated with the first phase value being determined, and then the element associated with the second phase depth value being determined based on the element associated with the first phase value. The element associated with the second phase value may be determined based on the cluster threshold value. The element associated with second phase value may be determined based on determining a distance from element associated with the first phase intensity value that does not meet or exceed threshold distance. Alternatively or additionally, the element associated with the second phase value may be further determined based on the neighborhood of pixels, the surface in the environment that is fit to the neighborhood of pixels, or the segmentation information.

The neighborhoods of pixels utilized to determine the data values may be pixels in the regions associated with the types of data values. The neighborhood of pixels utilized to determine the intensity values may be pixels in a first region associated with the intensity data. The neighborhood of pixels utilized to determine the depth values may be pixels in a second region associated with the depth data.

At operation 116, the process 100 may include determining a difference between the sensor data (e.g., the surface sensor data) associated with the surface. The difference may be determined as a variation determination. The variation determination may be associated with the depth value and/or the intensity value.

For example, the operation 116 may include determining that the difference between intensity data associated with the surface, object, or region determined in operation 114 is within an interference threshold value (e.g., the region is smooth with respect to intensity) while the difference between the phase data associated with the surface, object, or region determined in the operation 114 meets or exceeds an interference threshold value (e.g., the region is noisy with respect to phase/depth). In some examples, the intensity data for a region may be smooth while the phase/depth data for the corresponding region may be noisy. Whether a region is smooth or noisy can be determined utilizing variation determinations, as discussed herein.

The first variation determination may be associated with intensity values not greatly differing from each other. The intensity values not greatly differing from each other may be determined based on a difference between a first intensity value and a second intensity value being less than a threshold difference. The first intensity value may be within an interference threshold value away of the second intensity value. The interference threshold value for the comparison between the intensity values may be associated with a portion of the sensor data (e.g., the surface depth data, the surface intensity data, both the surface depth data and the surface intensity data, etc.).

In addition to or in the alternative to being analyzed based on any of the interference threshold values (e.g., the threshold difference or the interference threshold value), the intensity values for the first variation determination may be analyzed utilizing the constantly varying surface. The first variation determination may be analyzed utilizing predicted intensity values associated with the constantly varying surface.

The first variation determination may be performed based on the predicted intensity values associated with the constantly varying surface. The first variation determination may include determining that a difference between the first intensity value and the second intensity value do not meet or exceed a difference between a first predicted intensity value and a second predicted intensity value. The first predicted intensity value may be determined relative to a first neighboring intensity value (e.g., a first sample intensity value). The second predicted intensity value may be determined relative to a second neighboring intensity value (e.g., a second sample intensity value). The first neighboring intensity value and the second neighboring intensity value may be associated with a neighboring portion (e.g., a first neighboring portion) of the surface (e.g., a portion of the surface in the environment that is fit to the neighborhood of pixels).

Reference points may be used to determine portions of the surface associated with the predicted intensity values and the neighboring intensity values. Pixels or elements associated with the predicted intensity values may be determined based on a reference point (e.g., a first reference point (e.g., a first center point)). The portion of the surface associated with the first predicted intensity value and the second predicted intensity value may be determined based on the first reference point. Pixels or elements associated with the neighboring intensity values may be determined based on a reference point (e.g., a second reference point (e.g., a second center point)) associated with the first neighboring portion of the surface. A distance between the first reference point and the second reference point may be set as a reference point distance. The second reference point may be determined based on the reference point distance. The first neighboring portion of the surface associated with the first predicted intensity value and the second predicted intensity value may be determined based on the second reference point. A distance (e.g., a predicted intensity value distance) separating the pixel associated with the first predicted intensity value and the pixel associated with the second predicted intensity value may be determined. A distance (e.g., a neighboring intensity value distance) separating the pixel associated with the first neighboring intensity value and the pixel associated with the second neighboring intensity value may be determined. The predicted intensity value distance may be the same as the neighboring intensity value distance. For example, the predicted distance may be set as the neighboring intensity value distance, or vice versa.

The first variation determination may further include determining a difference between a first depth value and a second depth value. In some instances, the first variation determination (e.g., a first variation determination) may include the difference between the first depth value and the second depth value meeting or exceeding a threshold difference. The difference may be at or beyond the threshold difference.

In addition to or in the alternative to being analyzed based on any of the interference threshold values (e.g., the threshold difference or the interference threshold value), the depth values for the first variation determination may be analyzed utilizing the constantly varying surface. The first variation determination may be analyzed utilizing predicted depth values associated with the constantly varying surface.

The first variation determination may be performed based on the predicted depth values associated with the constantly varying surface. The first variation determination may include determining that a difference between the first depth value and the second depth value meets or exceeds a difference between a first predicted depth value and a second predicted depth value. The first predicted depth value may be determined relative to a first sample depth value (e.g., a first neighboring depth value). The second predicted depth value may be determined relative to a second sample depth value (e.g., a second neighboring depth value). The first neighboring depth value and the second neighboring depth value may be associated with a neighboring portion (e.g., a second neighboring portion) of the surface. The second neighboring portion associated with the neighboring depth values may be determined to correspond to (e.g., be associated with) the first neighboring portion of the surface associated with the neighboring intensity values.

Reference points may be used to determine portions of the surface associated with the predicted depth values and the neighboring depth values. Elements associated with the predicted depth values may be determined based on a reference point (e.g., a first reference point (e.g., a first center point)). The portion of the surface associated with the first predicted depth value and the second predicted depth value may be determined based on the first reference point. Elements associated with the neighboring depth values may be determined based on a reference point (e.g., a second reference point (e.g., a second center point)). A distance between the first reference point and the second reference point may be set as a predetermined reference point distance. The second reference point may be determined based on the predetermined reference point distance. The portion of the surface associated with the first predicted depth value and the second predicted depth value may be determined based on the second reference point. A distance (e.g., a predicted depth value distance) separating the element associated with the first predicted depth value and the element associated with the second predicted depth value may be determined. A distance (e.g., a neighboring depth value distance) separating the element associated with the first neighboring depth value and the element associated with the second neighboring depth value may be determined. The predicted depth value distance may be the same as the neighboring depth value distance. For example, the predicted distance may be set as the predetermined distance, or vice versa.

Although any of the data values (e.g., the depth values and/or the intensity values) determined based on the neighborhood of pixels are discussed throughout the disclosure, it is not limited as such. Any of the data values may be determined based on one or more neighborhoods of pixels or a combination of neighborhoods of pixels, in a similar way as for any of the neighborhoods of pixels discussed above. The neighborhoods in the combination of neighborhoods of pixels may be oriented (e.g., positioned) in any way with respect to each other. The neighborhoods in the combination of neighborhoods of pixels may be oriented in any way with respect to any of the portions of the surface associated with any the data values (e.g., the intensity and/or the depth values). Any number of neighboring pixel values in the neighborhood of pixels or of any of any number of neighborhoods of pixels of the combination of neighborhoods of pixels may be used to determine any of the data values (e.g., the intensity values and/or the depth values). Although the neighborhood(s) of pixels is discussed above in this disclosure, it is not limited as such. The term "neighborhood of pixels" may be utilized interchangeably with "surface in the environment that is fit to the neighborhood of pixels."

In some instances, the variation determination (e.g., a second variation determination) may include intensity values greatly differing from each other. The intensity values greatly differing from each other may be determined based on a difference between a third intensity value and a fourth intensity value meeting or exceeding a threshold difference. The third intensity value may be at or above the interference threshold value away from the fourth intensity value. The interference threshold value for the comparison between the intensity values may be associated with a portion of the sensor data (e.g., the surface depth data, the surface intensity data, both the surface depth data and the surface intensity data, etc.).

In addition to or in the alternative to being analyzed based on any of the interference threshold values (e.g., the threshold difference or the interference threshold value), the intensity values for the second variation determination may be analyzed in a similar way as for the first variation determination. For example, the intensity values for the second variation determination may be analyzed based on the constantly varying surface.

The second variation determination may be further associated with intensity values greatly differing from each other. The intensity values greatly differing from each other may be determined based on a difference between a third intensity value and a fourth intensity value meeting or exceeding a threshold difference. The third intensity value may be within the interference threshold value away of the fourth intensity value. The interference threshold value for the comparison between the intensity values may be associated with a portion of the sensor data (e.g., the surface depth data, the surface intensity data, both the surface depth data and the surface intensity data, etc.

The second variation determination may be further associated with depth values not greatly differing from each other. The depth values not greatly differing from each other may be determined based on a difference between a third depth value and a fourth depth value being less than a threshold difference. The third depth value may be within the interference threshold value away of the fourth depth value. The interference threshold value for the comparison between the depth values may be associated with a portion of the sensor data (e.g., the surface depth data, the surface intensity data, both the surface depth data and the surface intensity data, etc.).

In addition to or in the alternative to being analyzed based on any of the interference threshold values (e.g., the threshold difference or the interference threshold value), the depth values for the second variation determination may be analyzed in a similar way as for the first variation determination. For example, the depth values for the second variation determination may be analyzed based on the constantly varying surface.

At operation 118, the process 100 may include determining multipath interference based on the variation determination. The variation determination may be determined based on the difference associated with the depth value or the intensity value greatly differing from the threshold difference. The multipath interference associated with the first variation determination may be manifested as noise in depth data while intensity data associated with the surface may be smooth. The first variation determination may be associated with depth values greatly differing from each other, and intensity values not greatly differing from each other.

The surface intensity data and the surface depth data utilized for the first variation determination may be associated with regions. The regions may include a region (e.g., the first region) associated with the surface intensity data and a region (e.g., the second region) associated with the surface depth data. In some examples, the first region may be associated with the second region. The first region may be associated with pixels (e.g., a first pixel and a second pixel). The first pixel may have the first intensity value and the second pixel may have the second intensity value. The second region may be associated with phase elements (e.g., a first phase element and a second phase element). The first phase element may have the first depth value and the second phase element may have the second depth value. The first variation determination may be utilized to determine the first phase element and/or the second phase element as a candidate data element (e.g., candidate phase element) associated with multipath interference.

The multipath interference associated with the second variation determination may be manifested as noise in intensity data while depth data associated with the surface may be smooth. The second variation determination may be associated with intensity values greatly differing from each other, and depth values not greatly differing from each other.

The surface intensity data and the surface depth data utilized for the second variation determination may be associated with regions. The regions may include a region (e.g., a third region) associated with the surface intensity data and a region (e.g., a fourth region) associated with the surface depth data. In some examples, the third region may be associated with the fourth region. The third region may be associated with pixels (e.g., the third pixel and the fourth pixel). The third pixel may have the third intensity value and the fourth pixel may have the second intensity value. The fourth region may be associated with phase elements (e.g., a third phase element and a fourth phase element). The third phase element may have the third depth value and the fourth phase element may have the fourth depth value. The second variation determination may be utilized to determine the first pixel and/or the second pixel as a candidate data element (e.g., candidate pixel) associated with multipath interference.

Although a first type of sensor data (e.g., the intensity data or the depth data) may be utilized to determine a first region for a variation determination, which in turn may be utilized to determine that a second type of sensor data (e.g., the intensity data or the depth data) for a second region may be noisy, another type of sensor data may be utilized for the variation determination. That is, any type of data may be utilized to determine a region for any variation determination, which may be utilized to determine another type of sensor data for a corresponding region may be noisy (e.g., determine one or more outlier data values for the other type of sensor data).

At operation 120, the process 100 may include controlling a vehicle (e.g., the sensor 106) based on the difference. In some examples, one or more actions based on the difference can be determined, the action(s) including discarding sensor data, modifying one or more confidence levels, selecting sensor data, and/or correcting sensor data.

The multipath interference may be determined and utilized to remove or correct portions of the image. The image may be modified to discard any pixel associated with the multipath interference. The first pixel or the second pixel may be discarded (e.g., removed from the image), as the candidate pixel. The candidate pixel may be discarded based on determining the candidate pixel likely is associated with the multipath interference. Alternatively, the candidate pixel may be corrected and utilized in the image. The candidate pixel may be corrected based on one or more other pixels within the proximity. For example, the candidate pixel may be corrected based on the other pixel(s) separated from the candidate pixel by a distance that is less than a cluster threshold value (e.g., a threshold distance).

The multipath interference may be determined and may be smoothed out for the image. The image may be corrected by applying a smoothing algorithm to a portion of a candidate region of the sensor data. The candidate region may be determined as a region including the candidate pixel and/or phase element. The portion of the candidate region may be corrected, removed, discarded, or ignored (e.g., refrained from being utilized) to avoid discrepancies in the sensor data resulting from the multipath interference.

The image may be smoothed by a smoothing filter (e.g., a median filter or a radial filter) to the surface sensor data. The smoothing filter may be applied to the surface depth data and/or the surface intensity data. The candidate pixel may be corrected based on other pixels. The other pixels may be separated from the candidate pixel by a distance that is less than a threshold distance. The candidate pixel may be determined, as a modified candidate pixel, based on the other pixels. An interpolation may be performed between the other pixels. A result of the interpolation may include the modified candidate pixel based on a portion of the data associated with each of the other pixels. The modified candidate pixel may include a combined pixel, with each of the other pixels being combined into the combined pixel. The candidate pixel may be converted into the combined pixel, as the modified candidate pixel. In some examples, each of the other pixels may be positioned on any side of the candidate pixel. In those examples, the other pixels may be on opposite sides of the candidate pixel. Although pixel(s) (e.g., the first pixel, the second pixel, the third pixel, the fourth pixel etc.) and phase element(s) (e.g., the first phase element, the second phase element, the third phase element, the fourth phase element etc.) are discussed above in this disclosure, it is not limited as such and the term "sensor data" or "surface sensor data" may be utilized interchangeably with "pixel(s)" and/or "phase element(s)."

The vehicle can be controlled based on the discarded sensor data, the modified confidence level(s), the selected sensor data, and/or the corrected sensor data. However, controlling the vehicle is not limited to those actions, and the vehicle can be controlled based on other actions.

FIG. 2 illustrates an example environment and components of a vehicle, in accordance with examples of the disclosure. The example vehicle 202 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 202 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 can be any configuration of vehicle, such as, for example, a van, a sport utility vehicle, a cross-over vehicle, a truck, a bus, an agricultural vehicle, and/or a construction vehicle. The vehicle 202 can be powered by one or more internal combustion engines, one or more electric motors, hydrogen power, any combination thereof, and/or any other suitable power source(s). Although the example vehicle 202 has four wheels, the systems and methods described herein can be incorporated into vehicles having fewer or a greater number of wheels, tires, and/or tracks. The example vehicle 202 can have four-wheel steering and can operate generally with equal performance characteristics in all directions. For instance, the vehicle 202 may be configured such that a first longitudinal end of the vehicle 202 is the front end of the vehicle 202, and an opposite, second longitudinal end of the vehicle 202 is the rear end when traveling in a first direction, and such that the first end becomes the rear end of the vehicle 202 and the second end of the vehicle 202 becomes the front end of the vehicle 202 when traveling in the opposite direction. Stated differently, the vehicle 202 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 202 can be used to travel through an environment and collect data. For example, the vehicle 202 can include one or more sensor systems 204. The sensor system(s) 204 can be, for example, one or more time-of-flight (ToF) sensors, lidar sensors, radar sensors, sonar sensors, image sensors, audio sensors, infrared sensors, location sensors, etc., or any combination thereof. Certain implementations described herein may be particularly well-suited for use with ToF sensors, although other types of sensors also are contemplated. The sensor system(s) 204 may be disposed to capture sensor data associated with the environment. For example, the sensor data may be processed by a vehicle control system to identify and/or classify one or more objects in the environment, e.g., trees, vehicles, pedestrians, buildings, road surfaces, signage, barriers, road marking, or the like and/or to navigate the vehicle 202 relative to such object(s). In some examples, the object(s) can include an object 206 (e.g., a pedestrian).

As also illustrated in FIG. 2, the sensor system(s) 204 can include one or more processors 208 and memory 210 communicatively coupled to the processor(s) 208. The memory 210 can store processor-executable by the processor(s) 208 to cause the sensor system(s) 204 to perform functions that quantify glare and image data and/or correct the data to remove the impact of the glare, as detailed herein. The processor(s) 208 and/or the memory 210 may be physically integrated into the sensor system(s), e.g., as an SoC, FPGA, ASIC, or the like, or, in some implementations, the processor(s) 208 and/or the memory 210 may be available to, e.g., connected to receive signals from and/or send signals to, the sensor system(s) 204. As discussed above, the sensor system(s) 204 can determine the sensor data in various formats (e.g., a quadrature format, an intensity and depth format, and/or an unprojected format) using the processor(s) 208.

In the example of FIG. 2, the sensor system(s) 204 may include a ToF sensor, which may be configured to emit a carrier (e.g., a signal) and receive, e.g., capture, a response carrier (e.g., a response signal) comprising the carrier reflected off a surface in the environment. The ToF sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As also illustrated in FIG. 2, the sensor system(s) 204 may be configured to output the sensor data, e.g., the intensity and depth information, the quadrature values, or the like, as image data 212. The image data 212 may be embodied as image frames. The image data 212 can include a stream of serially-generated (e.g., at a predetermined interval) image frames. Each of the serially-generated image frames may be generated at different times. The serially-generated image frames may an image frame generated at a time t1, an image frame generated at a time t2, an image frame generated at a time t3, etc. Generally, each of the frames may include the same type of data, e.g., data related to the intensity and depth for each of a plurality of pixels comprising the receiver of the sensor. As illustrated in FIG. 2, the image data 212 can include a depth image 214 and an intensity image 216 generated by the sensor system(s) 204 and representative of a portion of the environment 200. Similarly, other instances, e.g., frames, of the image data 212 can include an intensity image and/or a depth image representative of the environment 200 at the corresponding sensing time.

As noted above, surfaces in the environment 200 may have different reflectively, and some highly reflective surfaces, e.g., lambertian reflectors, can result in multipath interference in the image data 212. Moreover, some less-reflective surfaces that are close to the sensor system(s) 204 can also result in multipath interference. In examples, multipath interference may impact more than just the pixels associated with the Lambertian reflector. Multipath interference may impact one or more pixels in the image data 212. For instance, multipath interference may impact substantially all pixels in the image data 212. Such impact may be visible in the image data 212 as gaps, bright lines, halos, altered colors, and/or altered shapes. In some examples, multipath interference can result in a variation in an intensity value, a depth value, or both the intensity value and the depth value. Multipath interference may be read by the sensor as a depth that is generally related to the depth of the (Lambertian) surface causing the multipath interference. Techniques described herein can correct for the multipath interference by determining the multipath interference associated with surface sensor data and discarding or correcting one or more pixels associated with the surface sensor data. For example, the image data 212 corrected using the techniques described herein may better represent the environment and/or may have a higher associated confidence.

As illustrated in FIG. 2, an interference detection system 218 may be configured to receive the image data 212 generated by the sensor system(s) 204. In more detail, the interference detection system 218 can include a value determination component 220 and a variation determination component 222. For clarity, the interference detection system 218 (and its components) are illustrated separate from the sensor system(s) 204 and from one or more vehicle control system(s) 224. However, portions of the interference detection system 218 may be implemented on one or both of the sensor system(s) 204 and/or the vehicle control system(s) 224. By way of non-limiting example, the processor(s) 208 may be configured to execute actions associated with the value determination component 220 and/or the variation determination component 222. In some examples, the value determination component 220 may be implemented separately from the variation determination component 222. In other examples, the value determination component 220 and the variation determination component 222 may be implemented as a single component.

The value determination component 220 may be configured to determine one or more data values associated with sensor data associated with a vehicle (e.g., surface sensor data associated with a surface). The surface sensor data may be determined based on sensor data (e.g., the image data 212) captured by the sensor system(s) 204. The value determination component 220 may be implemented to perform any determination of data values of the process, as described above in FIG. 1. In some examples, the value determination component 220 may determine, as any of the data value(s), one or more depth values associated with surface depth data and/or one or more intensity values associated with surface intensity data. The value determination component 220 may provide (e.g., output) the depth value(s) and/or the intensity value(s), which may be utilized to determine whether the surface sensor data is associated with the multipath interference.

The variation determination component 222 may be configured to determine whether the pixel(s) have been influenced by multipath interference. The variation determination component 222 may be implemented to perform any variation determination of the process, as described above in FIG. 1. In some examples, the variation determination may be associated with image data in an image frame generated at a time (e.g., a time t1). The variation determination may be utilized to determine data values (e.g., intensity values) in a region of the image frame, which may be utilized to determine another type of sensor data (e.g., depth data) for a corresponding region may be noisy (e.g., determine one or more outlier depth values for the depth data).

In some examples, the variation determination may be associated with image data in more than one image frame, including data in an image frame generated at a time (e.g., a time t1) and data in an image frame generated at a subsequent time (e.g., a time t2). The variation determination may be utilized to determine data values (e.g., intensity values) in a region of the image frame generated at the time t1, which may be utilized to determine another type of sensor data (e.g., depth data) for a corresponding region in the image frame generated at the time t2 may be noisy (e.g., determine one or more outlier depth values for the depth data). That is, any type of data may be utilized to determine a region of image data generated at any time, for any variation determination, which in turn may be utilized to determine another type of sensor data for a corresponding region of image data generated at the same time, or at a different time, may be noisy (e.g., determine one or more outlier data values for the other type of sensor data).

As also illustrated in FIG. 2, data (e.g., the variation determination) determined by the value determination component 220 and/or the variation determination component 222 may be transmitted to the sensor system(s) 204, and/or to the vehicle control system(s) 224, e.g., for use in controlling the vehicle 202. By way of non-limiting example, the vehicle control system(s) 224 can include a perception system 226 and a planning system 228. In examples, the perception system 226 may receive data from the variation determination component 222 and perform one or more of object detection, segmentation, and/or classification to determine objects in the data. The planning system 228 may determine a trajectory or route for the vehicle 202, e.g., relative to surfaces perceived by the perception system 226 based on the data received from variation determination component 222. As described herein, providing the vehicle control system(s) 224 with the data from the variation determination component 222 can improve safety outcomes, e.g., relative to providing the vehicle control system(s) 224 with the image data 212 impacted by multipath interference.

Figure 3:
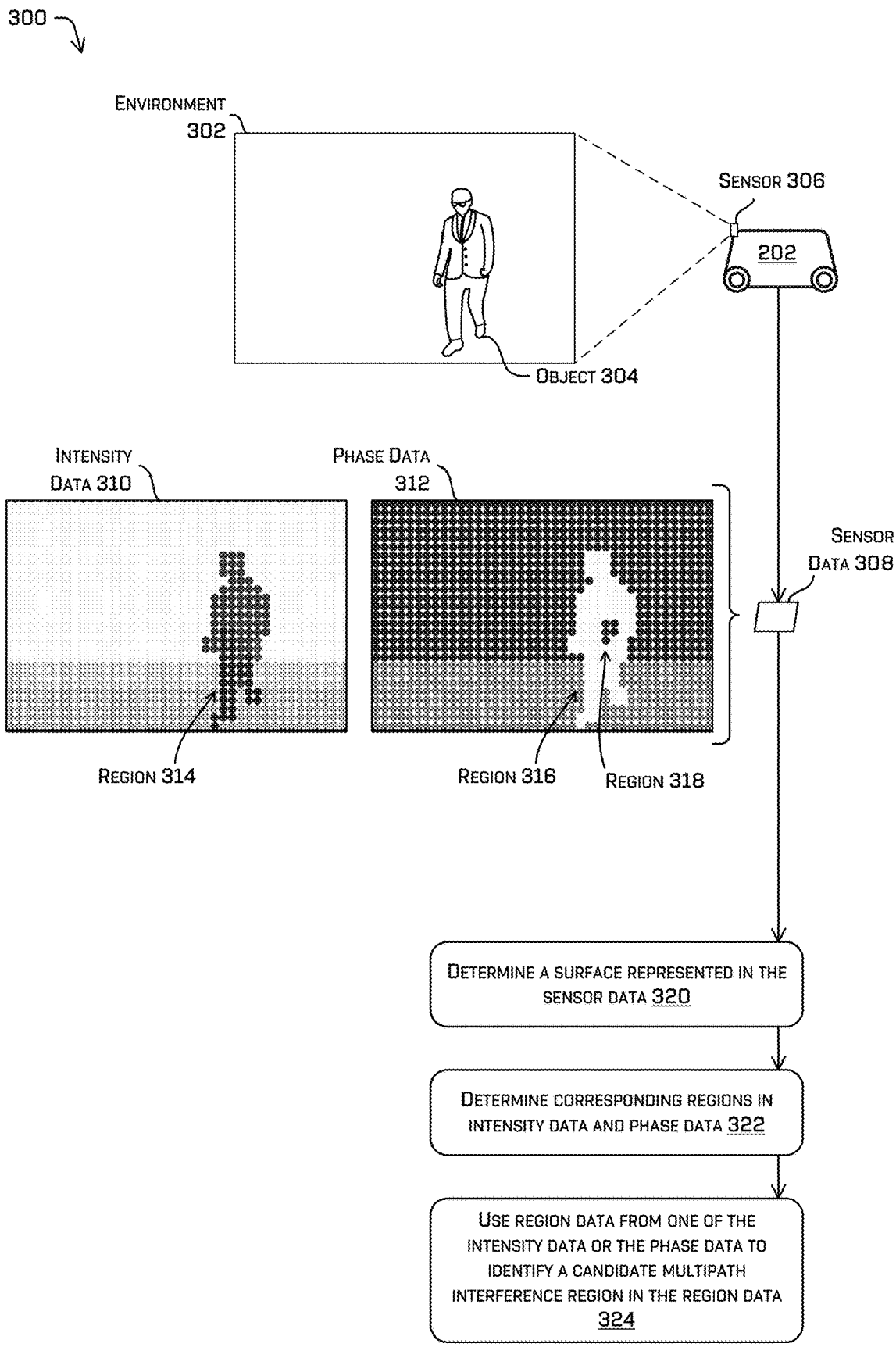
FIG. 3 illustrates textual and graphical flowcharts illustrative of a process for determining whether there is multipath interference, in accordance with examples of the disclosure.

FIG. 3 illustrates textual and graphical flowcharts illustrative of a process 300 for determining whether there is multipath interference, in accordance with examples of the disclosure.

In some examples, an environment 302 associated with the process 300 may include an object 304 (e.g., a pedestrian), although the environment 302 may include any surfaces, objects, or regions. The vehicle 202 travelling through the environment 302 may include one or more sensors. The sensor(s) may include a sensor 306 utilized to determine and/or provide captured sensor data associated with the environment. In some examples, any of the sensor(s) (e.g., the sensor 306) may be implemented as the sensor system 204 discussed above with respect to FIG. 2. One or more light beams may be transmitted by the sensor 306, reflected by one or more surfaces of objects (e.g., a lambertian object or the object 304) in the environment, and received by the sensor 306. The light beam(s) may be reflected based on a characteristic (e.g., reflectivity) of the surface(s). The light beam(s) may be transmitted, as transmitted light beam(s), by the sensor 306. The light beam(s) may be reflected, as reflected light beam(s), by the surface(s). The light beam(s) may be received, as received light beam(s), by the sensor 306. The light beam(s) may be utilized by the sensor 306 to capture and/or transmit the captured sensor data. The captured sensor data may be associated with a combined magnitude of multiple light beams. The captured sensor data may be associated with the light beams being combined, as a combined light beam with the combined magnitude.

The captured sensor data may be utilized to determine sensor data 308 (e.g., surface sensor data) associated with the object(s) (e.g., the lambertian object or the object 304). The sensor data 308 may include data of a type of data. The data type may include depth or intensity. The data of the type of data may include surface intensity data (e.g., intensity data) 310 and/or surface depth data (e.g., phase data) 312. The phase data 312 and the intensity data 310 may be associated with the surface(s). Portions of the sensor data 308 may be utilized to determine data values associated with the sensor data 308. A portion of the sensor data 308 may include the phase data 312 or the intensity data 310. The sensor data 308 may be utilized to determine a data value (e.g., surface depth value (e.g., surface phase value)) associated with the phase data 312. The sensor data 308 may be utilized to determine a data value (e.g., surface intensity value) associated with the intensity data 310. As illustrated, different intensity levels in the intensity data 310 are represented as different gray values. Similarly, different phase values (or different depth levels) in the phase data 312 are represented as different gray levels.

The intensity data 310 may include one or more pixels (e.g., a first pixel and a second pixel) in a region 314 (e.g., a first region). The second pixel may be adjacent and/or nearby (e.g., in the image space) to the first pixel. Alternatively or additionally, the second pixel may be within a proximity associated with the first pixel. For example, a distance between the first pixel and the second pixel may be less than a cluster threshold value (e.g., a threshold distance).

The phase data 312 (or depth data determined from the phase data) may include one or more phase elements (e.g., a first phase element and a second phase element) in a region 316 (e.g., a second region). The region 316 may correspond to the region 314. The second phase element may be adjacent and/or nearby (e.g., in the image space) to the first phase element. Alternatively or additionally, the second phase element may be within a proximity associated with the first phase element. For example, the distance between the first phase element and the second phase element may be less than a threshold distance.

In some examples, the region 314 and the region 316 may correspond to the object 304. Each of the region 314 and the region 316 may include a portion of the sensor data 308 associated with the object 304. The portion of the sensor data 308 may include a space enclosed within a boundary defining a perimeter of the object 304.

In some examples, the region 316 may include a region 318. A variation between the region 318 and another region (e.g., the region 316) and of the phase data 312 may be associated with multipath interference. The multipath interference causing the variation may be based on the light beam(s) being received from the object(s) (e.g., the lambertian object and/or the object 304). The first phase element may be included in the other region (e.g., the region 316), but not in the region 318. The second phase element may be included in the region 318.

At an operation 320, the process 300 may include an operation 320 for determining an object (e.g., the object 304) represented in the sensor data 308. The object 304 may be determined based on the sensor data 308 associated with light beam(s) received by one or more sensors (e.g., the ToF sensor) of the vehicle 202. The light beam(s) may include a light beam that is reflected by a surface (e.g., a first surface) and received by the ToF sensor, as a direct reflection. The light beam(s) may include a light beam that is reflected by a surface (e.g., the first surface) and received by the ToF sensor, as an indirect reflection. The light beam that is received as the indirect reflection may include a reflection by a second surface that may occur after the light beam is reflected by the first surface. The light beam(s) may include any number of additional light beams that are reflected by another surface (e.g., the other surface) and received by the ToF sensor, as direct reflections or indirection reflections.

At an operation 322, the process 300 may include an operation 322 for determining regions in the intensity data 310 and the phase data 312. The regions may include the region 314 and the region 316. The region 314 may be determined based on a neighborhood of pixels, a surface in the environment that is fit to the neighborhood of pixels, or segmentation information. The region 316 may be associated with, and determined based on, the region 314. For example, the region 314 may be determined, and then the region 316 may be determined based on the region 314. The region 314 may be determined by applying an edge detection operation to the intensity data 310. The region 316 may be an associated region with respect to the region 314. The region 316 may be further determined based on the neighborhood of pixels, the surface in the environment that is fit to the neighborhood of pixels, or the segmentation information. Although semantic segmentation is utilized for determination pixels, phase elements, or regions throughout this disclosure, it is not limited as such. The semantic segmentation may include, alternatively or additionally, fitting a surface to a portion of data, growing a region of the data, or determining a fixed sized patch.

At an operation 324, the process 300 may include an operation 324 for using region data from one of the intensity data 310 or the phase data 312 to identify a candidate multipath interference region in the region data. The region 316 or the region 318 may be determined as the candidate multipath interference region by performing a variation determination. A size of each of the region 316 and the region 318 may be any size. The variation determination may be utilized to determine phase values that greatly differ from each other. The phase values greatly differing from each other may be determined based on a difference between a first phase value and a second phase value meeting or exceeding a threshold difference. The first phase element may have the first depth value and the second phase element may have the second depth value. The variation determination may be utilized to determine the first phase element and/or the second phase element as a candidate phase element associated with multipath interference. The region 316 may be determined as the candidate multipath interference region based on the candidate phase element being in the region 316. The region 318 may be determined as the candidate multipath interference region based on the candidate phase element being in the region 318. Region data of the intensity data 310 may be utilized to identify a candidate multipath interference region associated with the intensity data 310 similarly as for the phase data 312.

Figure 4:
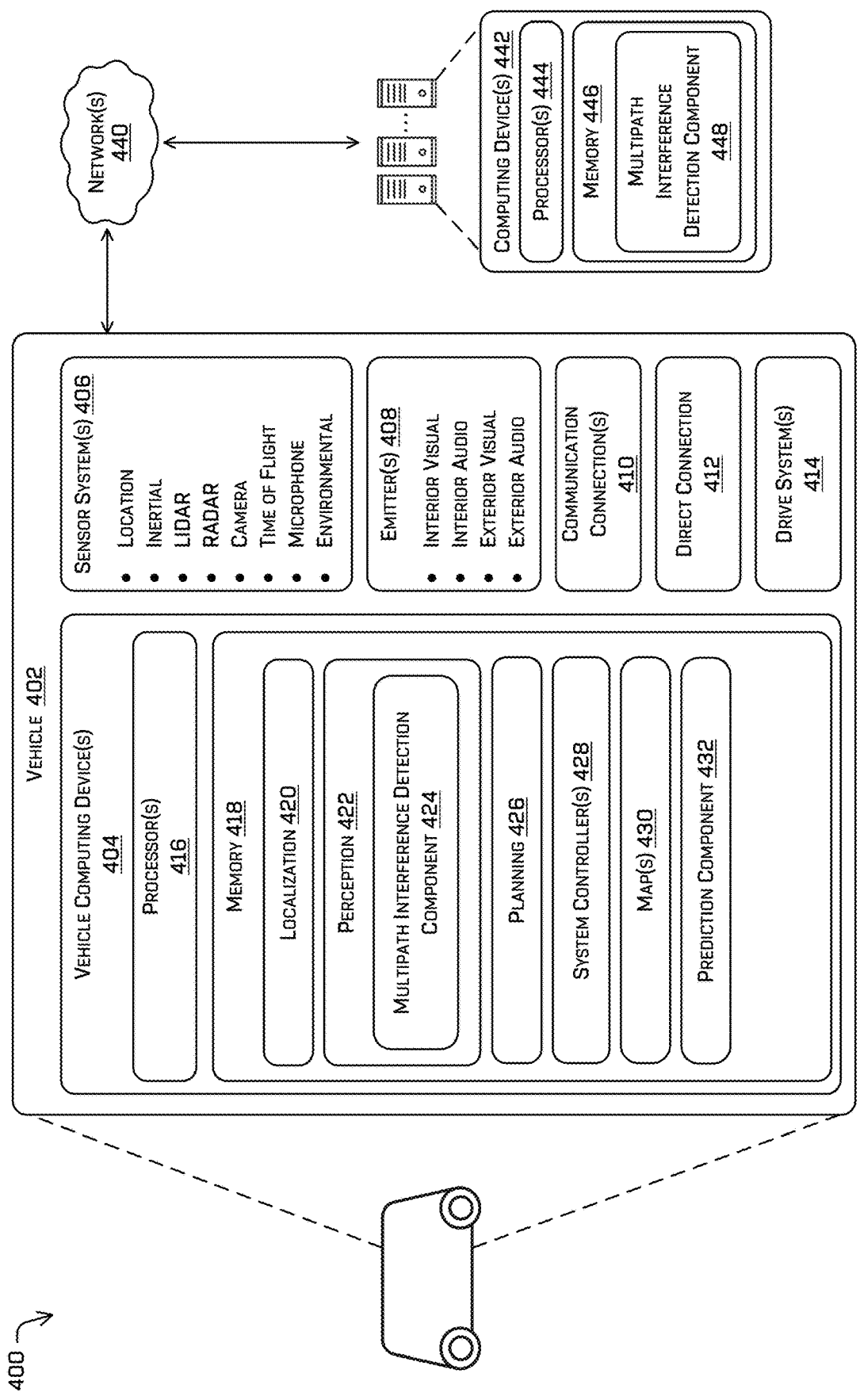
FIG. 4 depicts a block diagram of an example system for implementing the techniques described herein.

FIG. 4 depicts a block diagram of an example system 400 for implementing the techniques described herein. In at least one example, the system 400 can include a vehicle 402.

The vehicle 402 can include a vehicle computing device 404, one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422 comprising a multipath interference detection component 424, a planning component 426, one or more system controllers 428, one or more maps 430, and a prediction component 432. Though depicted in FIG. 4 as residing in memory 418 for illustrative purposes, it is contemplated that the localization component 420, the perception component 422, the multipath interference detection component 424, the planning component 426, the one or more system controllers 428, the one or more maps 430, and the prediction component 432 can additionally, or alternatively, be accessible to the vehicle 402 (e.g., stored remotely).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The multipath interference detection component 424 may be implemented similarly as for one or both of the value determination component 220 and the variation determination component 222 of FIG. 2, as described herein. For example, the multipath interference detection component 424 may include functionality to determine whether surface sensor data is associated with multipath interference. The surface sensor data being associated with multipath interference may be determined based on a comparison (e.g., a variation determination) utilizing sensor data values of the surface sensor data. The comparison may be performed for a difference between the sensor data values and a threshold difference. The sensor data values may be depth values of the surface depth data or intensity values of the surface intensity data. The comparison may include determining whether either a difference between the depth values, or a difference between the intensity values, meets or exceeds the threshold difference. In some examples, the multipath interference may be determined based on one of the differences meeting or exceeding the threshold difference. In those examples, the multipath interference may be determined further based on another one of the differences not meeting or exceeding the threshold difference. A discrepancy between the one difference meeting or exceeding the threshold difference and the other difference not meeting or exceeding the threshold difference may be associated with the multipath interference. The threshold difference for each of the comparisons may be the same threshold difference or different threshold differences.

In general, the planning component 426 can determine a path for the vehicle 402 to follow to traverse through an environment. For example, the planning component 426 can determine various routes and trajectories and various levels of detail. For example, the planning component 426 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 428, which can be configured to control steering, propulsion, braking, safety, emitters, communication, and other systems of the vehicle 402. These system controller(s) 428 can communicate with and/or control corresponding systems of the drive system(s) 414 and/or other components of the vehicle 402.

The memory 418 can further include one or more maps 430 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 430 can include at least one map (e.g., images and/or a mesh). In some examples, the vehicle 402 can be controlled based at least in part on the maps 430. That is, the maps 430 can be used in connection with the localization component 420, the perception component 422, and/or the planning component 426 to determine a location of the vehicle 402, identify objects in an environment, and/or generate routes and/or trajectories to navigate within an environment.

In some examples, the one or more maps 430 can be stored on a remote computing device(s) (such as the computing device(s) 442) accessible via network(s) 440. In some examples, multiple maps 430 can be stored based on, for example, a characteristic (e.g., type of entity, time of day, day of week, season of the year, etc.). Storing multiple maps 430 can have similar memory requirements, but increase the speed at which data in a map can be accessed.

In general, the prediction component 432 can generate predicted trajectories of objects in an environment. For example, the prediction component 432 can generate one or more predicted trajectories for vehicles, pedestrians, animals, and the like within a threshold distance from the vehicle 402. In some instances, the prediction component 432 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 418 (and the memory 446, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally or alternatively, the sensor system(s) 406 can send sensor data, via the one or more networks 440, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data to one or more computing device(s) 442 via the network(s) 440. In some examples, the vehicle 402 can send raw sensor data to the computing device(s) 442. In other examples, the vehicle 402 can send processed sensor data and/or representations of sensor data to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can include processor(s) 444 and a memory 446 storing a multipath interference detection component 448. In some instances, the multipath interference detection component 448 can substantially correspond to the multipath interference detection component 424 and can include functionality to determine a difference between different distance data, and determine whether pixel(s) have been influenced by multipath interference.

The processor(s) 416 of the vehicle 402 and the processor(s) 444 of the computing device(s) 442 can be any suitable processor capable of executing instructions to process data and perform operations as described herein. By way of example and not limitation, the processor(s) 416 and 444 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 446 are examples of non-transitory computer-readable media. The memory 418 and 446 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 442 and/or components of the computing device(s) 442 can be associated with the vehicle 402. That is, the vehicle 402 can perform one or more of the functions associated with the computing device(s) 442, and vice versa.

Figure 5:
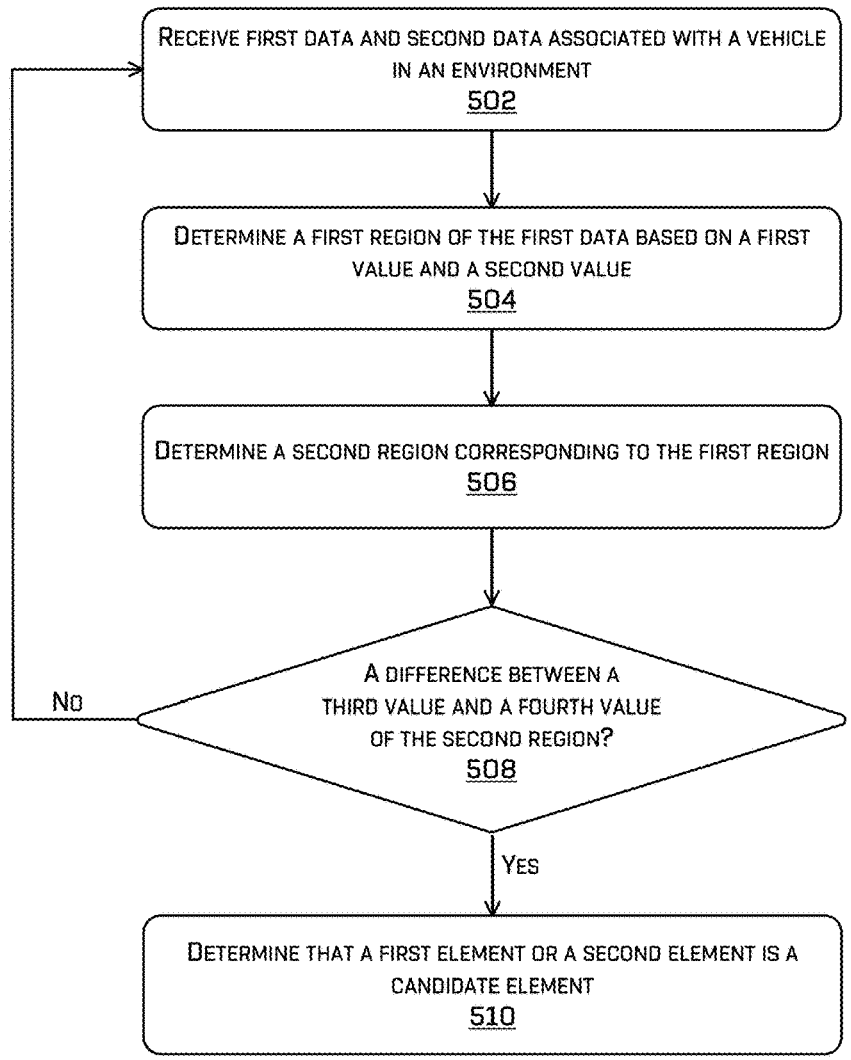
FIG. 5 is a flowchart depicting an example process for determining a difference between values associated with sensor data, and controlling a vehicle based on the difference, in accordance with examples of the disclosure.

FIG. 5 is a flowchart depicting an example process 500 for determining a difference between distance data associated with sensor data, and controlling a vehicle based on the difference, in accordance with examples of the disclosure.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500.

At operation 502, the process may include receiving first data and second data associated with an environment. The first data and the second data may be received from a sensor (e.g., a time-of-flight (ToF) sensor) associated with a vehicle in the environment. In some examples, the first data can be received from a first sensor and the second data can be received from a second sensor. The first data and the second data may be transmitted based on one or more light beams received by the ToF sensor. One or more light beams may be transmitted by the ToF sensor, reflected by an object (e.g., a lambertian object or another object (e.g., a pedestrian)) in the environment, and received by the ToF sensor. The light beam(s) may be reflected based on a characteristic (e.g., reflectivity) of the object. The light beam(s) may be transmitted, as transmitted light beam(s), by the sensor. The light beam(s) may be reflected, as reflected light beam(s), by the object. The light beam(s) may be received, as received light beam(s), by the sensor. The first data and/or the second data may be associated with a combined magnitude of multiple light beams.

At operation 504, the process may include determining a first region of the first data based on a first value and a second value. The first data may include one or more elements or pixels.

At operation 506, the process can include determining a second region of the second data corresponding to the first region.

At operation 508, the process can proceed to the operation 502, based on determining that a difference between the third value and the fourth value does not meet or exceed a threshold difference. The process can proceed to the operation 510, based on determining that the difference between the third value and the fourth value meets or exceeds the threshold difference.

At operation 510, the process can include determining that the first element or the second element is a candidate element. The first element or the second element is determined to be the candidate element based on the difference meeting or exceeding the threshold difference. The difference may be associated with the second data (e.g., the difference between the third value and the fourth value) being utilized to determine multipath interference. The difference may be associated with multipath interference being manifested as noise in the second data (e.g., intensity data or phase data) while the first data (e.g., intensity data or phase data) associated is smooth. The second data may be different from the first data.

EXAMPLE CLAUSES

A: A system comprising: one or more processors; and one or more non-transitory computer-readable media storing instructions executable by the one or more processors, wherein the instructions, when executed, cause the system to perform operations comprising: receiving sensor data comprising phase data and intensity data from a time-of-flight sensor associated with a vehicle in an environment; determining a first region of the intensity data based at least in part on a first intensity value of a first pixel and a second intensity value of a second pixel; determining, for a second region of the phase data corresponding to the first region of the intensity data, that a difference between a first phase value of associated with the second region and a second phase value associated with the second region meets or exceeds a threshold difference; determining, based at least in part on the difference, that at least one of a first phase element associated with the first phase value or a second phase element associated with the second phase value is a candidate element associated with multipath interference; and controlling the vehicle based at least in part on the candidate element being associated with multipath interference.

B: The system of paragraph A, the operations further comprising: applying, at least in part on the difference, at least one of a median filter or a radial filter to the second region of the phase data.

C: The system of paragraph A or B, wherein determining the first region comprises one or more of: determining semantic segmentation information associated with the intensity data, fitting a surface to a portion of the intensity data, applying a region growing operation to the intensity data, or determining a region of a fixed size.

D: The system of any of claims A-C, the operations further comprising: determining a third region of the phase data based at least in part on a third phase value of the phase data and a fourth phase value of the phase data; determining, for a fourth region of the intensity data corresponding to the third region of the phase data, a second difference between a third intensity value of a third pixel and a fourth intensity value of a fourth pixel; and determining, based at least in part on the second difference, that at least one of the third pixel or the fourth pixel is a candidate pixel associated with multipath interference.

E: The system of paragraph D, the operations further comprising: based at least in part on the second difference, at least one of: applying a smoothing algorithm to a portion of the fourth region of the intensity data; or refraining from utilizing the portion of fourth region of the intensity data.

F: A method comprising: receiving sensor data comprising first data having a first data type and second data having a second data type from a sensor in an environment; determining a first region of the first data associated with a surface in an environment; determining, based at least in part on the first region, a second region in the second data corresponding to the first region; determining a difference between a first element and a second element associated with the second region; and determining, based at least in part on the difference, that at least one of the first element or the second element is a candidate element associated with multipath interference.

G: The method of paragraph F, further comprising: applying, based at least in part on the difference, at least one of a median filter or a radial filter to the second region, wherein the first data type and the second data type are one or more of intensity data, phase data, or depth data.

H: The method of paragraph F or G, wherein determining the first region comprises one or more of: determining that a second difference between a first value of a first element of the first data and a second value of a second element of the first data meets or exceeds a threshold value, applying an edge detection operation to the first data, performing semantic segmentation of the first data, fitting a surface to a portion of the first data, growing a region of the first data, or determining a fixed sized patch.

I: The method of any of claims F-H, further comprising: determining a third region of the second data associated with a second surface in the environment; determining, for a fourth region of the first data associated with the second surface in the environment; determining a second difference between a third element and a fourth element associated with the fourth region; and determining, based at least in part on the second difference, that at least one of the third element or the fourth element is a second candidate element associated with multipath interference.

J: The method of paragraph I, further comprising: based at least in part on the second difference, at least one of: applying a smoothing algorithm to a portion of the fourth region of the second data; or refraining from utilizing the portion of the fourth region of the second data.

K: One or more non-transitory computer-readable media storing instructions executable by a processor, wherein the instructions, when executed, cause the processor to perform operations comprising: receiving sensor data from a sensor in an environment; transforming the sensor data into first data in a first domain and second data in a second domain; clustering the first data to determine a first region of the first data; determining, based at least in part on the first region, a second region of the second data corresponding to the first region; determining a difference between a first element and a second element associated with the second region; and determining, based at least in part on the difference, that at least one of the first element or the second element is a candidate data element associated with multipath interference.

L: The one or more non-transitory computer-readable media of paragraph K, wherein: the first data in the first domain is intensity data; and the second data in the second domain is depth data.

M: The one or more non-transitory computer-readable media of paragraph K or L, wherein: the first data in the first domain is depth data; and the second data in the second domain is intensity data.

N: The one or more non-transitory computer-readable media of any of claims K-M, the operations further comprising: applying, at least in part on the difference, at least one of a median filter or a radial filter to the second region of the second data.

O: The one or more non-transitory computer-readable media of any of claims K-N, wherein the sensor data is quadrature data from a time of flight sensor.

P: The one or more non-transitory computer-readable media of any of claims K-O, wherein determining the first region comprises one or more of: determining semantic segmentation information associated with the first data, fitting a surface to a portion of the first data, applying a region growing operation to the first data, or determining a region of a fixed size.

Q: The one or more non-transitory computer-readable media of any of claims K-P, wherein: the candidate data element is further determined based at least in part on a characteristic of the sensor; and the characteristic is associated with at least one of a quantum efficiency of the sensor, a noise floor of the sensor, or shot noise of the sensor.

R: The one or more non-transitory computer-readable media of any of claims K-Q, the operations further comprising: clustering the second data to determine a third region; determining, based at least in part on the third region, a fourth region of the first data corresponding to the third region; determining a second difference between a third element and a fourth element associated with the fourth region; and determining, based at least in part on the second difference, that at least one of the third element or the fourth element is a second candidate data element associated with multipath interference.

S: The one or more non-transitory computer-readable media of any of claims K-R, the operations further comprising: based at least in part on the second difference, at least one of: applying a smoothing algorithm to a portion of the second region of the second data; or refraining from utilizing the portion of the second region of the second data.

T: The one or more non-transitory computer-readable media of any of claims K-S, the operations further comprising: controlling a vehicle based at least in part on the at least one of the first element or the second element being determined to be the candidate data element.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data comprising phase data and intensity data from a time-of-flight sensor associated with a vehicle in an environment;
determining a first region of the intensity data based at least in part on a first intensity value of a first pixel and a second intensity value of a second pixel;
determining, for a second region of the phase data corresponding to the first region of the intensity data, that a difference between a first phase value of associated with the second region and a second phase value associated with the second region meets or exceeds a threshold difference;
determining, based at least in part on the difference, that at least one of a first phase element associated with the first phase value or a second phase element associated with the second phase value is a candidate element associated with multipath interference; and
controlling the vehicle based at least in part on the candidate element being associated with multipath interference.

2. The system of claim 1, the operations further comprising:
applying, at least in part on the difference, at least one of a median filter or a radial filter to the second region of the phase data.

3. The system of claim 1, wherein determining the first region comprises one or more of:
determining semantic segmentation information associated with the intensity data,
fitting a surface to a portion of the intensity data,
applying a region growing operation to the intensity data, or determining a region of a fixed size.

4. The system of claim 1, the operations further comprising:
determining a third region of the phase data based at least in part on a third phase value of the phase data and a fourth phase value of the phase data;
determining, for a fourth region of the intensity data corresponding to the third region of the phase data, a second difference between a third intensity value of a third pixel and a fourth intensity value of a fourth pixel; and
determining, based at least in part on the second difference, that at least one of the third pixel or the fourth pixel is a candidate pixel associated with multipath interference.

5. The system of claim 4, the operations further comprising:
based at least in part on the second difference, at least one of:
applying a smoothing algorithm to a portion of the fourth region of the intensity data; or
refraining from utilizing the portion of the fourth region of the intensity data.

6. A method comprising:
receiving sensor data comprising first data having a first data type and second data having a second data type from a sensor in an environment;
determining a first region of the first data associated with a surface in the environment;
determining, based at least in part on the first region, a second region in the second data corresponding to the first region;
determining a difference between a first element and a second element associated with the second region; and
determining, based at least in part on the difference, that at least one of the first element or the second element is a candidate element associated with multipath interference.

7. The method of claim 6, further comprising:
applying, based at least in part on the difference, at least one of a median filter or a radial filter to the second region,
wherein the first data type and the second data type are one or more of intensity data, phase data, or depth data.

8. The method of claim 6,
wherein determining the first region comprises one or more of:
determining that a second difference between a first value of a first element of the first data and a second value of a second element of the first data meets or exceeds a threshold value,
applying an edge detection operation to the first data,
performing semantic segmentation of the first data,
fitting a candidate surface to a portion of the first data,
growing a region of the first data, or
determining a fixed sized patch.

9. The method of claim 6, further comprising:
determining a third region of the second data associated with a second surface in the environment;
determining, for a fourth region of the first data associated with the second surface in the environment;
determining a second difference between a third element and a fourth element associated with the fourth region; and
determining, based at least in part on the second difference, that at least one of the third element or the fourth element is a second candidate element associated with multipath interference.

10. The method of claim 9, further comprising:
based at least in part on the second difference, at least one of:
applying a smoothing algorithm to a portion of the fourth region of the second data; or
refraining from utilizing the portion of the fourth region of the second data.

11. One or more non-transitory computer-readable media storing instructions executable by a processor, wherein the instructions, when executed, cause the processor to perform operations comprising:
receiving sensor data from a sensor in an environment;
transforming the sensor data into first data in a first domain and second data in a second domain;
clustering the first data to determine a first region of the first data;
determining, based at least in part on the first region, a second region of the second data corresponding to the first region;
determining a difference between a first element and a second element associated with the second region; and
determining, based at least in part on the difference, that at least one of the first element or the second element is a candidate data element associated with multipath interference.

12. The one or more non-transitory computer-readable media of claim 11, wherein:
the first data in the first domain is intensity data; and
the second data in the second domain is depth data.

13. The one or more non-transitory computer-readable media of claim 11, wherein:
the first data in the first domain is depth data; and
the second data in the second domain is intensity data.

14. The one or more non-transitory computer-readable media of claim 11, the operations further comprising:
applying, at least in part on the difference, at least one of a median filter or a radial filter to the second region of the second data.

15. The one or more non-transitory computer-readable media of claim 11, wherein the sensor data is quadrature data from a time of flight sensor.

16. The one or more non-transitory computer-readable media of claim 11, wherein determining the first region comprises one or more of:
determining semantic segmentation information associated with the first data,
fitting a surface to a portion of the first data,
applying a region growing operation to the first data, or determining a region of a fixed size.

17. The one or more non-transitory computer-readable media of claim 11, wherein:
the candidate data element is further determined based at least in part on a characteristic of the sensor; and the characteristic is associated with at least one of a quantum efficiency of the sensor, a noise floor of the sensor, or shot noise of the sensor.

18. The one or more non-transitory computer-readable media of claim 11, the operations further comprising:
  clustering the second data to determine a third region;
  determining, based at least in part on the third region, a fourth region of the first data corresponding to the third region;
  determining a second difference between a third element and a fourth element associated with the fourth region; and
  determining, based at least in part on the second difference, that at least one of the third element or the fourth element is a second candidate data element associated with multipath interference.

19. The one or more non-transitory computer-readable media of claim 18, the operations further comprising:
  based at least in part on the second difference, at least one of:
    applying a smoothing algorithm to a portion of the second region of the second data; or
    refraining from utilizing the portion of the second region of the second data.

20. The one or more non-transitory computer-readable media of claim 11, the operations further comprising:
  controlling a vehicle based at least in part on the at least one of the first element or the second element being determined to be the candidate data element.

* * * * *